US010642605B2

(12) United States Patent
Miyazaki et al.

(10) Patent No.: US 10,642,605 B2
(45) Date of Patent: May 5, 2020

(54) VEHICLE CONTROL DEVICE, PROGRAM UPDATE METHOD, AND COMPUTER-READABLE NON-TRANSITORY STORAGE MEDIUM STORING PROGRAM FOR PROGRAM UPDATE

(71) Applicant: TOYOTA JIDOSHA KABUSHIKI KAISHA, Toyota-shi, Aichi-ken (JP)

(72) Inventors: Yasuyuki Miyazaki, Toyota (JP); Masaki Miyake, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/242,544

(22) Filed: Jan. 8, 2019

(65) Prior Publication Data
US 2019/0258476 A1  Aug. 22, 2019

(30) Foreign Application Priority Data
Feb. 16, 2018 (JP) .................................. 2018-026153

(51) Int. Cl.
*G06F 8/658* (2018.01)
*B60R 16/023* (2006.01)

(52) U.S. Cl.
CPC ............ *G06F 8/658* (2018.02); *B60R 16/023* (2013.01)

(58) Field of Classification Search
CPC ...................................................... G06F 8/658
USPC ........................................................ 717/168
See application file for complete search history.

(56) References Cited

U.S. PATENT DOCUMENTS

| 7,509,636 | B2 * | 3/2009 | McGuire | G06F 8/658 |
| | | | | 717/168 |
| 8,904,374 | B2 * | 12/2014 | Nakamura | G06F 8/66 |
| | | | | 717/168 |
| 2004/0143828 | A1 * | 7/2004 | Liu | G06F 8/654 |
| | | | | 717/168 |
| 2006/0004756 | A1 * | 1/2006 | Peleg | G06F 8/62 |

(Continued)

FOREIGN PATENT DOCUMENTS

JP        2016-60407 A     4/2016

OTHER PUBLICATIONS

Yutaka Onuma et al.; "A Method of ECU Software Updating"; The 32nd International Conference on Information Networking (ICOIN 2018); Jan. 2018 (Year: 2018).*

*Primary Examiner* — Qing Chen
*Assistant Examiner* — Clint Thatcher
(74) *Attorney, Agent, or Firm* — Oliff PLC

(57) ABSTRACT

The vehicle control device includes: a storage section including a first and a second storage areas in which a control program and an updated program which is an updated version of the control program are stored respectively; an execution section executing either of these programs; and an update section acquiring updated-portion data from an server, causing data of a post-update portion indicated by the updated-portion data and data of a portion, other than the update-target portion, of the control program stored in the first storage area to be stored as the updated program in the second storage area, and changing a program, to be executed by the execution section, to the updated program in a case of determining that the updated program is correctly stored, on the basis of a difference between the control program and the updated program stored in the first and second storage areas respectively.

15 Claims, 5 Drawing Sheets

(56) References Cited

U.S. PATENT DOCUMENTS

| | | | |
|---|---|---|---|
| 2009/0094591 A1* | 4/2009 | Sugimoto | G06F 8/65 717/168 |
| 2009/0217257 A1* | 8/2009 | Huang | G06F 8/65 717/168 |
| 2010/0175062 A1* | 7/2010 | Kim | G06F 8/65 717/173 |
| 2011/0179406 A1* | 7/2011 | Ohama | G06F 11/1433 717/168 |
| 2011/0231834 A1* | 9/2011 | Kim | G06F 1/3212 717/173 |
| 2012/0102477 A1* | 4/2012 | Kim | G06F 8/654 717/169 |
| 2017/0286094 A1* | 10/2017 | Westerkowsky | H04W 4/70 |
| 2017/0322796 A1* | 11/2017 | Kim | G06F 8/65 |
| 2018/0349129 A1* | 12/2018 | Ju | G06F 8/658 |

\* cited by examiner

VEHICLE CONTROL DEVICE, PROGRAM UPDATE METHOD, AND COMPUTER-READABLE NON-TRANSITORY STORAGE MEDIUM STORING PROGRAM FOR PROGRAM UPDATE

BACKGROUND OF THE INVENTION

Field of the Invention

The present invention relates to: a vehicle control device to be mounted to a vehicle or the like; a method for updating a program of the vehicle control device; and a program for the program update.

Description of the Background Art

A vehicle is mounted with a plurality of control devices called ECUs (Electronic Control Units), which include storage sections and control sections (processors). Each of the control sections executes programs stored in the storage section, to perform processes for various kinds of vehicle control.

Such programs are sometimes updated for modification and addition of functions. Patent document 1 (Japanese Laid-Open Patent Publication No. 2016-60407) discloses a system in which data for updating a program is downloaded to a portable terminal device over a network and the data is provided from the portable terminal device to a vehicle, so that the program is rewritten to be updated.

If the program is not correctly updated so that data generated as a post-update program at least partially remains pre-update data or is different from data of a correctly updated version, an ECU for executing the program may execute an abnormal operation.

SUMMARY OF THE INVENTION

An object of the present invention is, in view of the above-described problem, to provide a vehicle control device, a method for a program update, and a program for the program update, with which it is possible, at the time of an update of a program, to confirm that the program has been correctly changed to data of a post-update portion.

In order to solve the above-described problem, one aspect of the present invention is a vehicle control device including: a storage section including a first storage area in which a control program for use in control of a vehicle is stored, and a second storage area in which an updated program which is an updated version of the control program is stored; an execution section configured to execute the control program and the updated program; and an update section configured to acquire, from an external server, updated-portion data that indicates data of a post-update portion for an update-target portion of the control program, and execute a process of updating the control program, wherein the update section: causes the data of the post-update portion indicated by the updated-portion data to be stored in a first portion of the second storage area and causes data of a portion, other than the update-target portion, of the control program stored in the first storage area to be stored in a second portion, which is different from the first portion, of the second storage area, thereby causing the updated program to be stored in the second storage area; acquires a difference between the control program stored in the first storage area and the updated program stored in the second storage area; determines, on the basis of at least the difference, whether or not the updated program is correctly stored in the second storage area; and changes a program, to be executed by the execution section, to the updated program in a case of determining that the updated program is correctly stored in the second storage area.

Accordingly, since the program to be executed is changed to the updated program after it is confirmed that the updated program is correctly stored in the second storage area, it is possible to inhibit the ECU from executing an abnormal operation as a result of execution of an incorrect program.

In addition, in a case where the difference and the data of the post-update portion indicated by the updated-portion data acquired from the server match each other, the update section may determine that the updated program is correctly stored.

By using the updated-portion data as a comparison target as described above, it is possible to check whether or not the changed portion of the updated program matches update content.

In addition, in a case where the difference includes the data of the portion other than the update-target portion based on the updated-portion data, the update section may determine that the updated program is not correctly stored, and may re-execute the process in which the data of the portion, other than the update-target portion, of the control program stored in the first storage area is caused to be stored at a corresponding position in the second storage area.

Owing to this feature, it is possible to detect that the data of the portion, other than the update-target portion, of the updated program is not correctly stored, and the data can be corrected by re-executing the process.

In addition, in a case where the difference and a part or an entirety of the data of the post-update portion do not match each other in the update-target portion based on the updated-portion data, the update section may determine that the updated program is not correctly stored, and may re-execute the process in which the data of the post-update portion indicated by the updated-portion data is caused to be stored at a corresponding position in the second storage area.

In addition, in a case where the difference and a part or the entirety of the data of the post-update portion do not match each other in the update-target portion based on the updated-portion data, the update section may determine that the updated program is not correctly stored, and may execute a process in which a portion, which does not match the difference, of the data of the post-update portion indicated by the updated-portion data is caused to be stored at a corresponding position in the second storage area.

Owing to these features, it is possible to detect that the data of the update-target portion of the updated program is not correctly stored, and the data can be corrected by re-executing the process.

In addition, the update section may enquire of the server, and, in a case where the difference and the data of the post-update portion indicated by the updated-portion data held by the server match each other, the update section may determine that the program having been updated is correctly stored.

By using, as the comparison target, the updated-portion data held by the server as described above, it is possible to detect also a data error due to a communication error of the updated-portion data, or the like, so that it is possible to more assuredly confirm that the changed portion of the updated program matches the update content.

In addition, in a case where the difference includes the data of the portion other than the update-target portion based on the updated-portion data held by the server, the update section may determine that the updated program is not correctly stored, and may re-execute the process in which the data of the portion, other than the update-target portion, of the control program stored in the first storage area is caused to be stored at the corresponding position in the second storage area.

Owing to this feature, by using, as the comparison target, the updated-portion data held by the server, it is possible to detect also a data error due to a communication error of the updated-portion data, or the like, so that it is possible to more assuredly detect that the data of the portion, other than the update-target portion, of the updated program is not correctly stored, and the data can be corrected by re-executing the process.

In addition, in a case where the difference and a part or the entirety of the data of the post-update portion do not match each other in the update-target portion based on the updated-portion data held by the server, the update section: may determine that the updated program is not correctly stored; may re-acquire the updated-portion data from the server; and may re-execute the process in which the data of the post-update portion indicated by the updated-portion data having been acquired is caused to be stored at the corresponding position in the second storage area.

In addition, in a case where the difference and a part or the entirety of the data of the post-update portion do not match each other in the update-target portion based on the updated-portion data held by the server, the update section: may determine that the updated program is not correctly stored; may re-acquire, from the server, a non-matching portion, which does not match the difference, of the data of the post-update portion indicated by the updated-portion data held by the server; and may execute a process in which the non-matching portion having been acquired is caused to be stored at the corresponding position in the second storage area.

Owing to these features, by using, as the comparison target, the updated-portion data held by the server, it is possible to detect also a data error due to a communication error of the updated-portion data, or the like, so that it is possible to more assuredly detect that the data of the update-target portion of the updated program is not correctly stored, and the data can be corrected by re-executing the process.

Another aspect of the present invention is a program update method to be executed by an update section of a vehicle control device including: a storage section including a first storage area in which a control program for use in control of a vehicle is stored, and a second storage area in which an updated program which is an updated version of the control program is stored; an execution section configured to execute the control program and the updated program; and the update section configured to acquire, from an external server, updated-portion data that indicates data of a post-update portion for an update-target portion of the control program, and execute a process of updating the control program, the program update method including: a step of causing the data of the post-update portion indicated by the updated-portion data to be stored in a first portion of the second storage area, and causing data of a portion, other than the update-target portion, of the control program stored in the first storage area to be stored in a second portion, which is different from the first portion, of the second storage area, thereby causing the updated program to be stored in the second storage area; a step of acquiring a difference between the control program stored in the first storage area and the updated program stored in the second storage area; a step of determining, on the basis of at least the difference, whether or not the updated program is correctly stored in the second storage area; and a step of changing a program, to be executed by the execution section, to the updated program in a case where it is determined that the updated program is correctly stored in the second storage area.

Still another aspect of the present invention is a computer-readable non-transitory storage medium storing a program, for a program update, to be executed by an update section of a vehicle control device including: a storage section including a first storage area in which a control program for use in control of a vehicle is stored, and a second storage area in which an updated program which is an updated version of the control program is stored; an execution section configured to execute the control program and the updated program; and the update section configured to acquire, from an external server, updated-portion data that indicates data of a post-update portion for an update-target portion of the control program, and execute a process of updating the control program, the program including: a step of causing the data of the post-update portion indicated by the updated-portion data to be stored in a first portion of the second storage area, and causing data of a portion, other than the update-target portion, of the control program stored in the first storage area to be stored in a second portion, which is different from the first portion, of the second storage area, thereby causing the updated program to be stored in the second storage area; a step of acquiring a difference between the control program stored in the first storage area and the updated program stored in the second storage area; a step of determining, on the basis of at least the difference, whether or not the updated program is correctly stored in the second storage area; and a step of changing a program, to be executed by the execution section, to the updated program in a case where it is determined that the updated program is correctly stored in the second storage area.

Owing to these features, since the program to be executed is changed to the updated program after it is confirmed that the updated program is correctly stored in the second storage area, it is possible to inhibit the ECU from executing an abnormal operation as a result of execution of an incorrect program.

According to the present invention, since, at the time of the program update, the program to be executed is changed to the updated program after it is confirmed that the updated program is correctly stored, it is possible to inhibit the ECU from executing an abnormal operation as a result of execution of an incorrect program, as described above.

DESCRIPTION OF THE PREFERRED EMBODIMENTS (Outline)

At the time of a program update, a vehicle control device according to the present invention changes a program, to be executed, from a pre-update program to a post-update program after confirming that data of the post-update program is not erroneous but correct. Therefore, a program including erroneous data is not executed, and an abnormal operation can be inhibited from being executed.

Embodiment

Hereinafter, an embodiment of the present invention will be described in details with reference to the drawings.
<Configuration>

Figure 1:
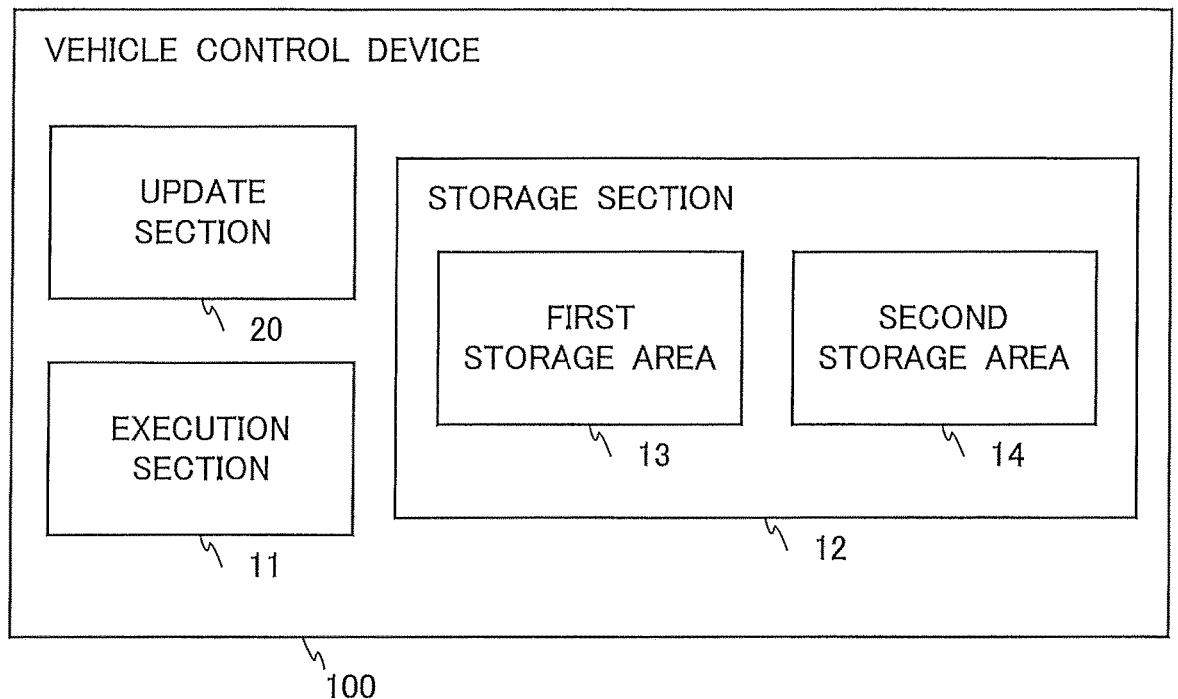
FIG. 1 is a functional block diagram of a vehicle control device according to an embodiment of the present invention.

FIG. 1 shows a functional block diagram of a vehicle control device 100 according to the present embodiment. An example of the vehicle control device 100 is an automatic driving ECU that performs automatic driving control of a vehicle, and that allows the vehicle to be driven while controlling steering, an engine, a brake, and the like on the basis of input from various sensors. The vehicle control device 100 includes: an execution section 11 which is a processor; a storage section 12 which is a nonvolatile memory such as a flash ROM, for example; and an update section 20. The storage section 12 includes a first storage area 13 and a second storage area 14. The execution section 11 executes a control program which is a present program that is to be executed and that is stored in the first storage area 13. The above-described automatic driving control is performed in response to output for executing the control program. It is noted that the vehicle control device 100 may include a volatile RAM.

The update section 20 can communicate with a server located outside the vehicle over a network via an OTA receiver or the like mounted to the vehicle, and acquires data for use in a program update from the server. When acquiring the data, the update section 20 causes an updated program which is an updated version of the control program to be stored in the second storage area 14 of the storage section 12 on the basis of the data. It is noted that the function of the update section 20 may be executed by the execution section 11.

Figure 2:
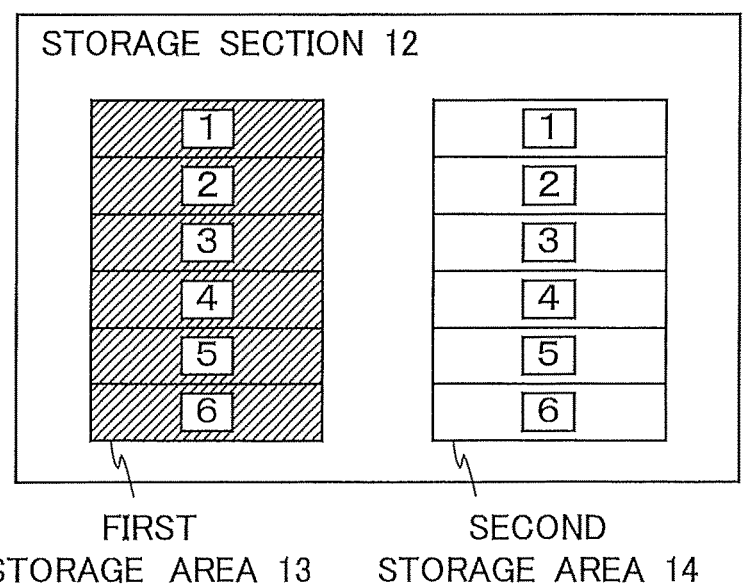
FIG. 2 is a schematic diagram of a storage section of the vehicle control device according to the embodiment of the present invention.

FIG. 2 schematically shows the storage section 12 in which the control program is stored in the first storage area 13 and the updated program is not stored in the second storage area 14. In the drawings, portions storing the respective data according to the present embodiment are hatched. In shown examples, the first storage area 13 and the second storage area 14 are each partitioned into six blocks, i.e., blocks 1 to 6, for convenience of description.
<Process>

Figure 3:
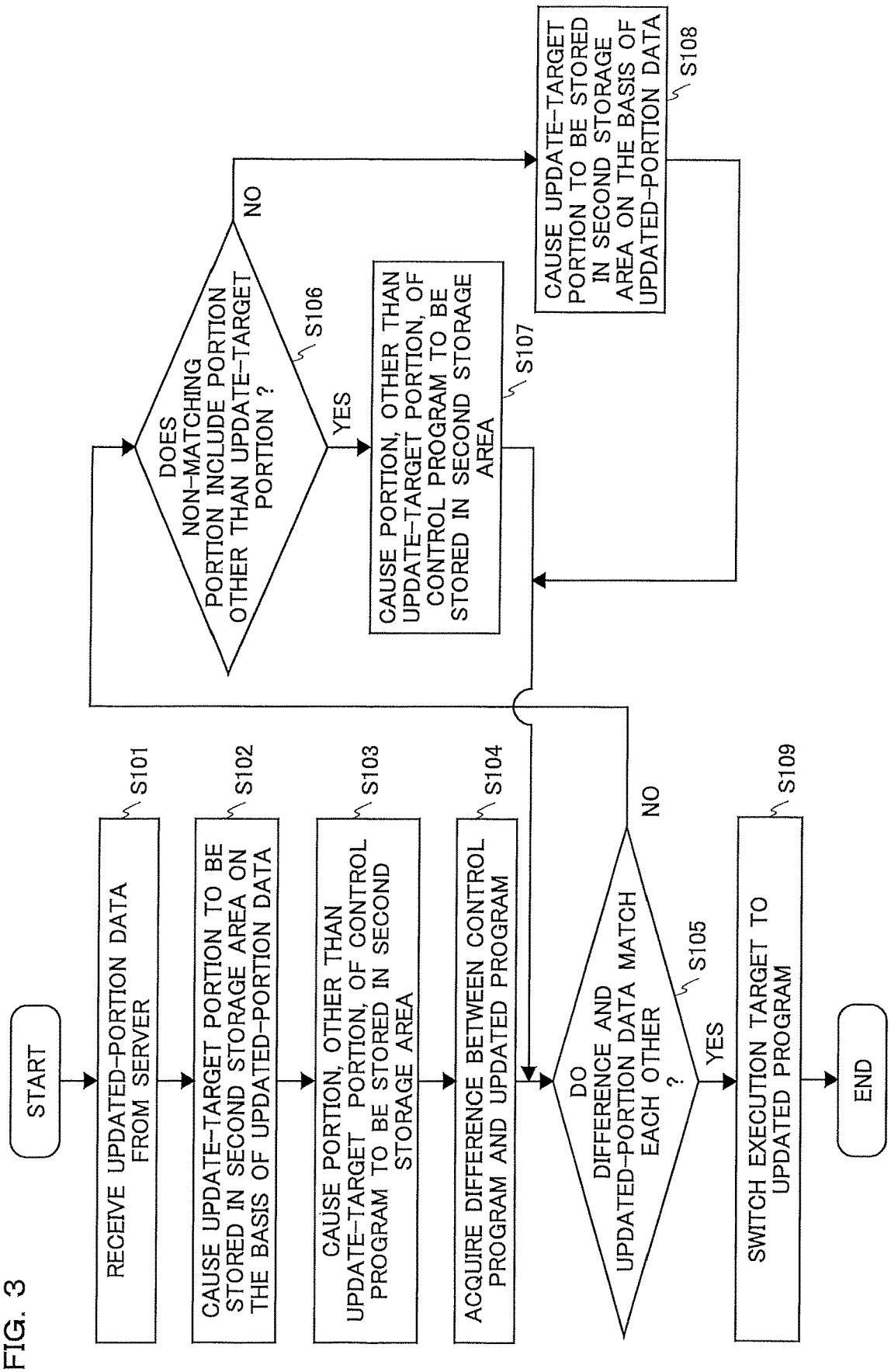
FIG. 3 is a flowchart showing a process by the vehicle control device according to the embodiment of the present invention.

Hereinafter, an example of a program update process according to the present embodiment will be described. First, FIG. 3 is a flowchart for explaining an update process that is performed by the update section 20. This process is started when, for example, the update section 20 gets access to the server located outside the vehicle.

(Step S101): The update section 20 acquires updated-portion data from the server located outside the vehicle. The updated-portion data is data that indicates data of post-update portions for update-target portions of the control program. The updated-portion data includes, for example, information that specifies the update-target portions, and the data of the post-update portions.

Figure 4:
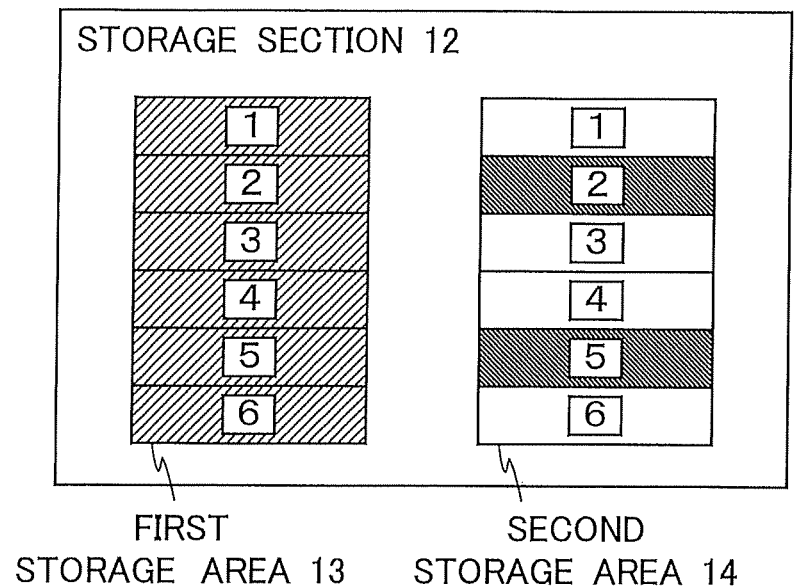
FIG. 4 is a schematic diagram of the storage section of the vehicle control device according to the embodiment of the present invention.

(Step S102): The update section 20 generates the data of the post-update portions on the basis of the updated-portion data, and causes the data of the post-update portions to be stored in the update-target portions (first portions) of the second storage area 14. FIG. 4 shows the storage section 12 in which the data of the post-update portions are stored. In the shown example, updated portions indicated by the updated-portion data are blocks 2 and 5, and the update section 20 causes the data of the post-update program to be stored in blocks 2 and 5 of the second storage area 14.

Figure 5:
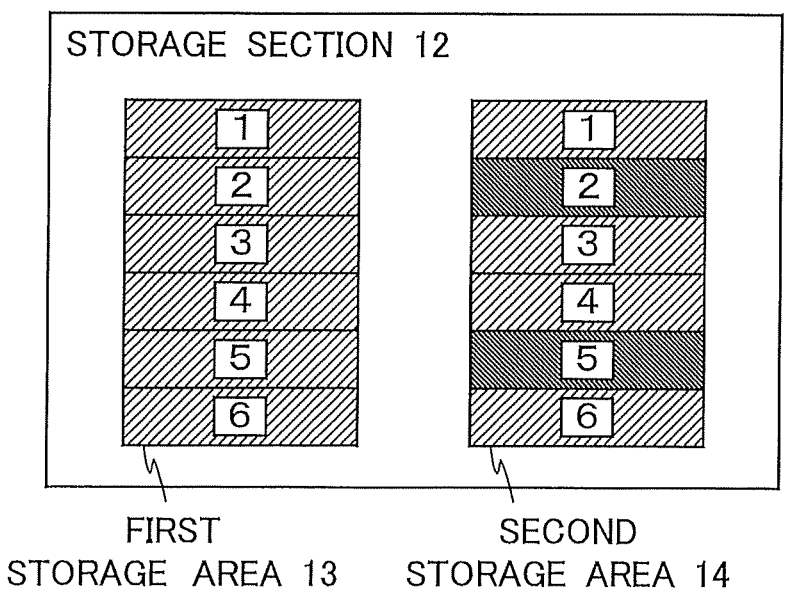
FIG. 5 is a schematic diagram of the storage section of the vehicle control device according to the embodiment of the present invention.

(Step S103): The update section 20 causes data of portions, other than the update-target portions, of the control program stored in the first storage area 13 to be copied and stored in corresponding portions (second portions) of the second storage area 14. FIG. 5 shows the storage section 12 in which the data of the portions other than the update-target portions are stored. In the shown example, the portions other than the update-target portions are blocks 1, 3, 4, and 6, and the update section 20 causes data of blocks 1, 3, 4, and 6 of the control program stored in the first storage area 13 to be copied and stored in blocks 1, 3, 4, and 6 of the second storage area 14.

(Step S104): The update section 20 compares the control program stored in the first storage area 13 and the updated program stored in the second storage area 14 with each other, thereby acquiring the difference therebetween. In the shown example in FIG. 5, if no error is present in the data stored in the second storage area 14 in the processes performed in steps S101 to S103, the difference is present in data of blocks 2 and 5. In the following steps, it is confirmed that no error is present in the data, or, if any error occurs in the data for some reasons, the error is detected and the data is corrected.

(Step S105): The update section 20 compares the difference and the updated-portion data with each other. By using the updated-portion data as a comparison target, it is possible to assuredly check whether or not the changed portions of the updated program matches update content. In a case where the difference does not match the data of the post-update portions indicated by the updated-portion data, the update section 20 determines that the updated program stored in the second storage area 14 is not correctly stored, and the process proceeds to step S106. In a case where the difference matches the data of the post-update portions indicated by the updated-portion data, the update section 20 determines that the updated program stored in the second storage area 14 is correctly stored, and the process proceeds to step S109. It is noted that, as the updated-portion data which is the comparison target, the updated-portion data acquired in step S101 may be used, or comparison may be made with updated-portion data held by the server. In this case, i.e. in a case where comparison is made with the updated-portion data held by the server, the difference may be transmitted to the server so that a determination result is received therefrom. Accordingly, even if a data error due to a communication error or the like is present in the updated-portion data initially acquired by the update section 20, the error can be detected and corrected.

(Step S106): The update section 20 checks whether or not the portions at which the difference and the data of the post-update portions indicated by the updated-portion data do not match each other include any of the portions other than the update-target portions. In a case where the difference includes the data of the portions other than the update-target portions, the update section 20 determines that the data have not been correctly copied in the process in which the control program is copied from the first storage area 13 to the second storage area 14 in step S103, and the process proceeds to step S107. In a case where the difference does not include the data of the portions other than the update-target portions, the portions at which the difference and the data of the post-update portions indicated by the updated-portion data do not match each other are included among the update-target portions, and thus, the update section 20 determines that the data have failed to be correctly generated or stored in the process in which the data of the post-update portions are generated or in the process in which the data of the post-update portions are caused to be stored in the update-target portions of the second storage area 14 in step S102, and the process proceeds to step S108.

Figure 6:
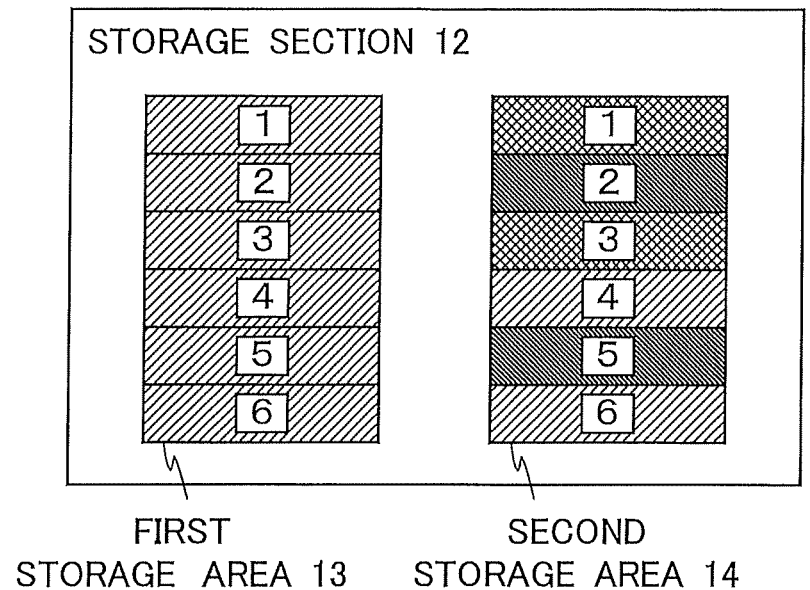
FIG. 6 is a schematic diagram of the storage section of the vehicle control device according to the embodiment of the present invention.
Figure 6:
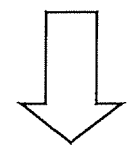
Figure 6:
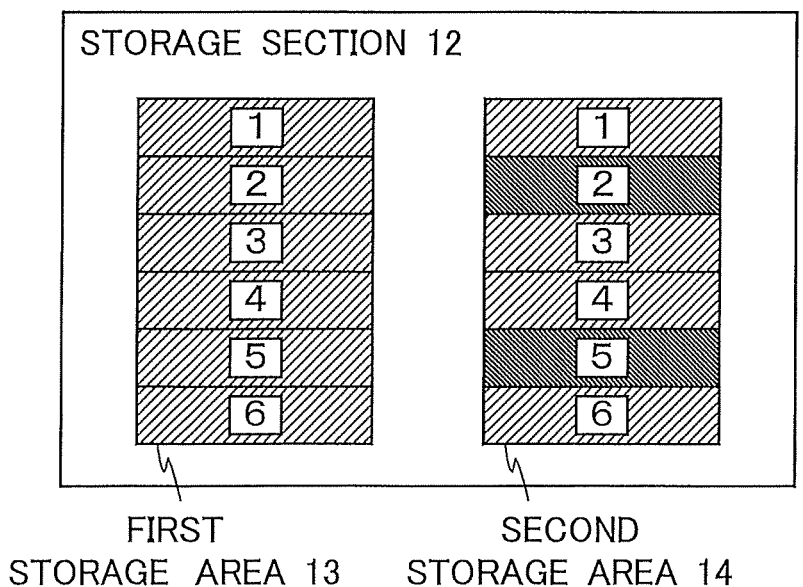

(Step S107): The update section 20 executes the same process as that in step S103, to cause the data of the portions, other than the update-target portions, of the control program stored in the first storage area 13 to be copied and stored at the corresponding positions in the second storage area 14. FIG. 6 shows an example of a state of the storage section 12 before and after execution of this step. In the shown example, the difference is present in blocks 1, 2, 3, and 5, and the data of the portions other than the update-target portions in the difference are data of blocks 1 and 3, at least in which a data error is present. The update section 20 causes the data of blocks 1, 3, 4, and 6 that are the data of the portions, other than the update-target portions, of the control program stored in the first storage area 13 to be copied and stored in blocks 1, 3, 4, and 6 of the second storage area 14. It is noted that, in order to reduce the processing amount, the update section 20 may cause only data of portions, which are included in the difference, among the portions other than the update-target portions to be copied from the first storage area 13 to the second storage area 14. In the shown example, only the data of blocks 1 and 3 in which the difference is present, may be copied from the first storage area 13 to the second storage area 14. After execution of this step, the process proceeds to step S105.

Figure 7:
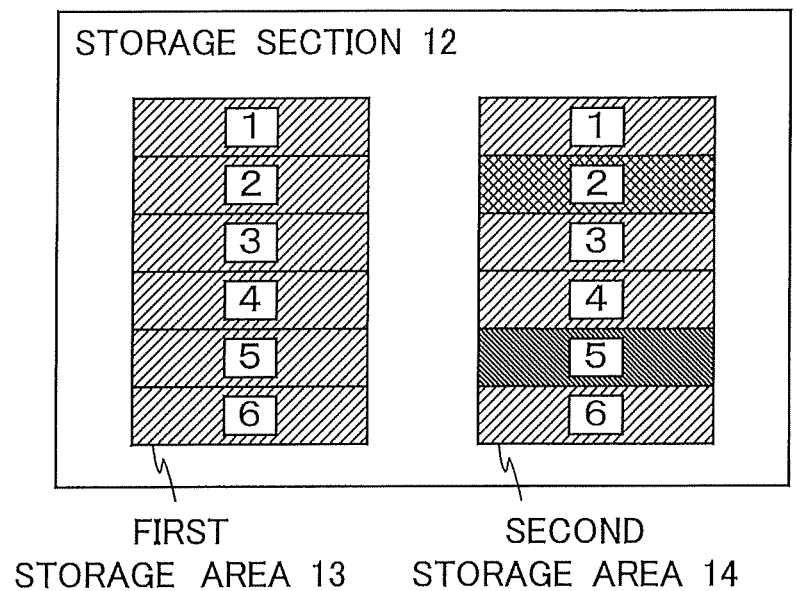
FIG. 7 is a schematic diagram of the storage section of the vehicle control device according to the embodiment of the present invention.
Figure 7:
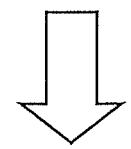
Figure 7:
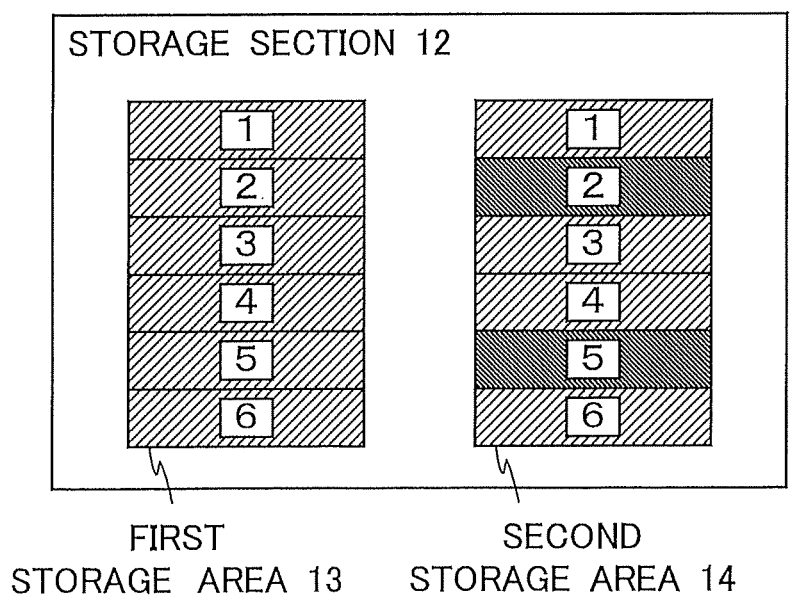

(Step S108): The update section 20 executes the same process as that in step S102, to generate the data of the post-update portions on the basis of the updated-portion data, and to cause the data of the post-update portions to be stored in the update-target portions of the second storage area 14. FIG. 7 shows an example of the state of the storage section 12 before and after execution of this step. In the shown example, the difference is present in blocks 2 and 5 which are update-target portions, and, of the update-target portions, a portion that does not match the data of the post-update portions indicated by the updated-portion data is block 2, in which a data error is present. The update section 20 generates the data, of blocks 2 and 5, which are the data of the post-update portions on the basis of the updated-portion data, and causes the data of blocks 2 and 5 to be stored in blocks 2 and 5 of the second storage area 14. Alternatively, in order to reduce the processing amount, the update section 20 may newly generate only the portion, of the updated-portion data, that does not match the difference, and may cause only this portion to be stored in the second storage area 14. In the shown example, only the data of block 2 may be generated and stored in the second storage area 14. Regarding the updated-portion data, the entirety of the updated-portion data held by the server, or a part thereof indicating a portion that does not match the difference, may be re-acquired, and the data of the post-update portions may be generated on the basis of the re-acquired updated-portion data. In the case where only a part of the updated-portion data is re-acquired, the communication amount can be reduced. By re-acquiring the updated-portion data, even if a data error due to a communication error or the like is present in the updated-portion data initially acquired by the update section 20, this error can be detected and corrected.

If the mismatch between the difference and the data of the post-update portions indicated by the updated-portion data is eliminated by repeating one or more times the processes of steps S106 to S108 described above, the difference and the data of the post-update portions indicated by the updated-portion data match each other, and thus determination is made such that the process proceeds to step S109, in the subsequent process of step S105.

(Step S109): The update section 20 changes the program, to be executed by the execution section 11, from the control program stored in the first storage area 13 to the updated program stored in the second storage area 14. This change can be executed by, for example, the update section 20 rewriting a predetermined storage area from the first storage area 13 to the second storage area 14, the predetermined storage area being provided in the storage section 12 or the like and being referred to by the execution section 11 as a program read-out source. Accordingly, the execution section 11 executes the updated program at the start of program execution such as the next start-up. After the above-described steps, the process is ended. In the first storage area 13, the stored pre-update control program may be deleted. In addition, the first storage area 13 can be used as a storage area for an updated program that is to be executed next time. In this case, if the update section 20 confirms that the updated program has been correctly updated, the update section 20 changes the program, to be executed by the execution section 11, from the program stored in the second storage area 14 to the program stored in the first storage area 13.

<Effects>

In the update process according to the above-described embodiment, the execution target of the execution section is changed to the updated program after it is confirmed that the updated program is correctly stored in the second storage area in the process in which the update section causes the updated program to be stored in the second storage area. Thus, it is possible to inhibit the ECU from executing an abnormal operation as a result of execution of an incorrect program. In addition, if, for some reasons, an error occurs in data and the updated program is not correctly stored in the second storage area, the data can be corrected such that the updated program is correctly stored in the second storage area 14, by re-executing at least a part of the process.

It is noted that the present invention is applicable to not only a vehicle control device but also a method for updating a program to be executed by a processor of the vehicle control device, and a computer-readable non-transitory storage medium storing a program for the program update.

The present invention is useful for, for example, a vehicle including an in-vehicle device such as an automatic driving device.

What is claimed is:
1. A vehicle control device comprising:
   a storage section including a first storage area in which a control program for use in control of a vehicle is stored, and a second storage area in which an updated program which is an updated version of the control program is stored;

an execution section configured to execute the control program and the updated program; and an update section configured to acquire, from an external server, updated-portion data that indicates data of a post-update portion for an update-target portion of the control program, and execute a process of updating the control program, wherein the update section causes the data of the post-update portion indicated by the updated-portion data to be stored in a first portion of the second storage area and causes data of a portion, other than the update-target portion, of the control program stored in the first storage area to be stored in a second portion, which is different from the first portion, of the second storage area, thereby causing the updated program to be stored in the second storage area, acquires a difference between the control program stored in the first storage area and the updated program stored in the second storage area, determines, on the basis of at least the difference, whether or not the updated program is correctly stored in the second storage area, and changes a program, to be executed by the execution section, to the updated program in a case of determining that the updated program is correctly stored in the second storage area.

2. The vehicle control device according to claim 1, wherein, in a case where the difference and the data of the post-update portion indicated by the updated-portion data acquired from the server match each other, the update section determines that the updated program is correctly stored.

3. The vehicle control device according to claim 2, wherein, in a case where the difference includes the data of the portion other than the update-target portion based on the updated-portion data, the update section determines that the updated program is not correctly stored, and re-executes the process in which the data of the portion, other than the update-target portion, of the control program stored in the first storage area is caused to be stored at a corresponding position in the second storage area.

4. The vehicle control device according to claim 2, wherein, in a case where the difference and a part or an entirety of the data of the post-update portion do not match each other in the update-target portion based on the updated-portion data, the update section determines that the updated program is not correctly stored, and re-executes the process in which the data of the post-update portion indicated by the updated-portion data is caused to be stored at a corresponding position in the second storage area.

5. The vehicle control device according to claim 4, wherein, in a case where the difference and a part or the entirety of the data of the post-update portion do not match each other in the update-target portion based on the updated-portion data, the update section determines that the updated program is not correctly stored, and executes a process in which a portion, which does not match the difference, of the data of the post-update portion indicated by the updated-portion data is caused to be stored at a corresponding position in the second storage area.

6. The vehicle control device according to claim 1, wherein the update section enquires of the server, and, in a case where the difference and the data of the post-update portion indicated by the updated-portion data held by the server match each other, the update section determines that the program having been updated is correctly stored.

7. The vehicle control device according to claim 6, wherein, in a case where the difference includes the data of the portion other than the update-target portion based on the updated-portion data held by the server, the update section determines that the updated program is not correctly stored, and re-executes the process in which the data of the portion, other than the update-target portion, of the control program stored in the first storage area is caused to be stored at the corresponding position in the second storage area.

8. The vehicle control device according to claim 6, wherein, in a case where the difference and a part or the entirety of the data of the post-update portion do not match each other in the update-target portion based on the updated-portion data held by the server, the update section determines that the updated program is not correctly stored, re-acquires the updated-portion data from the server, and re-executes the process in which the data of the post-update portion indicated by the updated-portion data having been acquired is caused to be stored at the corresponding position in the second storage area.

9. The vehicle control device according to claim 8, wherein, in a case where the difference and a part or the entirety of the data of the post-update portion do not match each other in the update-target portion based on the updated-portion data held by the server, the update section determines that the updated program is not correctly stored, re-acquires, from the server, a non-matching portion, which does not match the difference, of the data of the post-update portion indicated by the updated-portion data held by the server, and executes a process in which the non-matching portion having been acquired is caused to be stored at the corresponding position in the second storage area.

10. A program update method to be executed by an update section of a vehicle control device comprising:

a storage section including a first storage area in which a control program for use in control of a vehicle is stored, and a second storage area in which an updated program which is an updated version of the control program is stored;

an execution section configured to execute the control program and the updated program; and the update section configured to acquire, from an external server, updated-portion data that indicates data of a post-update portion for an update-target portion of the control program, and execute a process of updating the control program, the program update method comprising:
- a step of causing the data of the post-update portion indicated by the updated-portion data to be stored in a first portion of the second storage area, and causing data of a portion, other than the update-target portion, of the control program stored in the first storage area to be stored in a second portion, which is different from the first portion, of the second storage area, thereby causing the updated program to be stored in the second storage area;
- a step of acquiring a difference between the control program stored in the first storage area and the updated program stored in the second storage area;
- a step of determining, on the basis of at least the difference, whether or not the updated program is correctly stored in the second storage area; and
- a step of changing a program, to be executed by the execution section, to the updated program in a case where it is determined that the updated program is correctly stored in the second storage area.

11. A computer-readable non-transitory storage medium storing a program, for a program update, to be executed by an update section of a vehicle control device comprising:
- a storage section including a first storage area in which a control program for use in control of a vehicle is stored, and a second storage area in which an updated program which is an updated version of the control program is stored;
- an execution section configured to execute the control program and the updated program; and
- the update section configured to acquire, from an external server, updated-portion data that indicates data of a post-update portion for an update-target portion of the control program, and execute a process of updating the control program, the program comprising:
- a step of causing the data of the post-update portion indicated by the updated-portion data to be stored in a first portion of the second storage area, and causing data of a portion, other than the update-target portion, of the control program stored in the first storage area to be stored in a second portion, which is different from the first portion, of the second storage area, thereby causing the updated program to be stored in the second storage area;
- a step of acquiring a difference between the control program stored in the first storage area and the updated program stored in the second storage area;
- a step of determining, on the basis of at least the difference, whether or not the updated program is correctly stored in the second storage area; and
- a step of changing a program, to be executed by the execution section, to the updated program in a case where it is determined that the updated program is correctly stored in the second storage area.

12. The vehicle control device according to claim 3, wherein,
in a case where the difference and a part or an entirety of the data of the post-update portion do not match each other in the update-target portion based on the updated-portion data, the update section determines that the updated program is not correctly stored, and re-executes the process in which the data of the post-update portion indicated by the updated-portion data is caused to be stored at a corresponding position in the second storage area.

13. The vehicle control device according to claim 12, wherein,
in a case where the difference and a part or the entirety of the data of the post-update portion do not match each other in the update-target portion based on the updated-portion data, the update section determines that the updated program is not correctly stored, and executes a process in which a portion, which does not match the difference, of the data of the post-update portion indicated by the updated-portion data is caused to be stored at a corresponding position in the second storage area.

14. The vehicle control device according to claim 7, wherein,
in a case where the difference and a part or the entirety of the data of the post-update portion do not match each other in the update-target portion based on the updated-portion data held by the server,
the update section
- determines that the updated program is not correctly stored,
- re-acquires the updated-portion data from the server, and
- re-executes the process in which the data of the post-update portion indicated by the updated-portion data having been acquired is caused to be stored at the corresponding position in the second storage area.

15. The vehicle control device according to claim 14, wherein,
in a case where the difference and a part or the entirety of the data of the post-update portion do not match each other in the update-target portion based on the updated-portion data held by the server,
the update section
- determines that the updated program is not correctly stored,
- re-acquires, from the server, a non-matching portion, which does not match the difference, of the data of the post-update portion indicated by the updated-portion data held by the server, and
executes a process in which the non-matching portion having been acquired is caused to be stored at the corresponding position in the second storage area.

* * * * *